J. I. EDWARDS.
EGG CARRIER.
APPLICATION FILED OCT. 14, 1918. RENEWED AUG. 4, 1920.
1,362,482.
Patented Dec. 14, 1920.
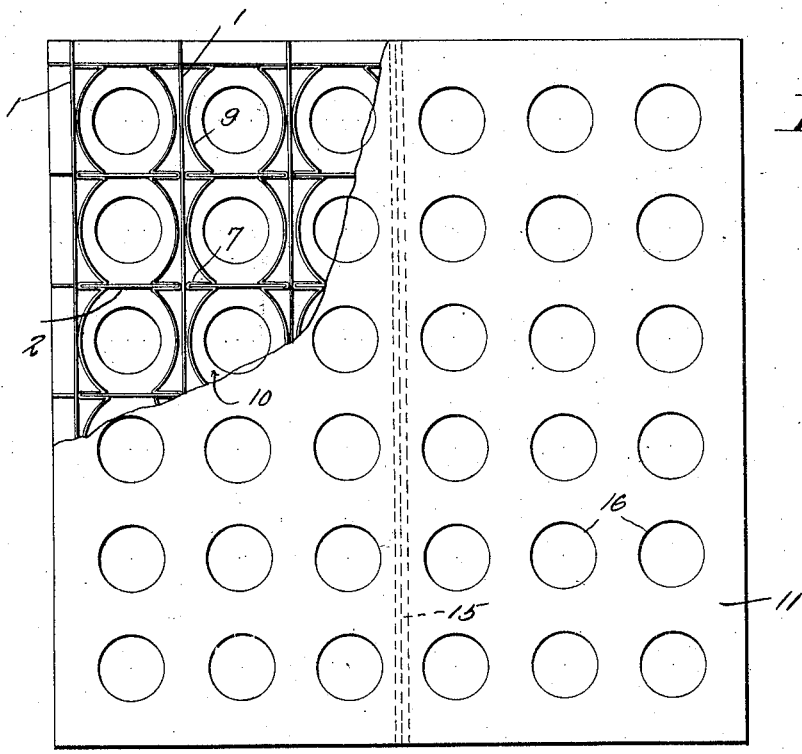
Fig. 1.
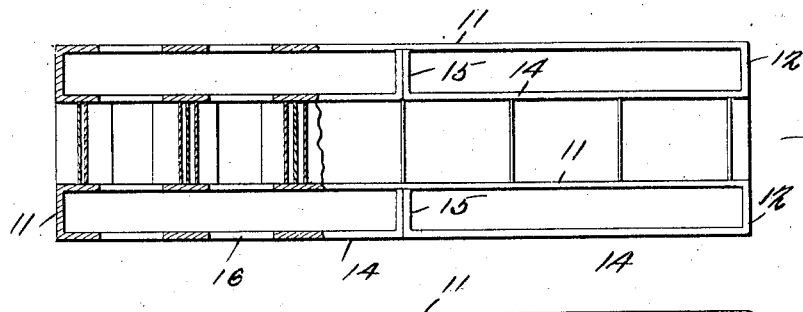
Fig. 2.
Fig. 3.
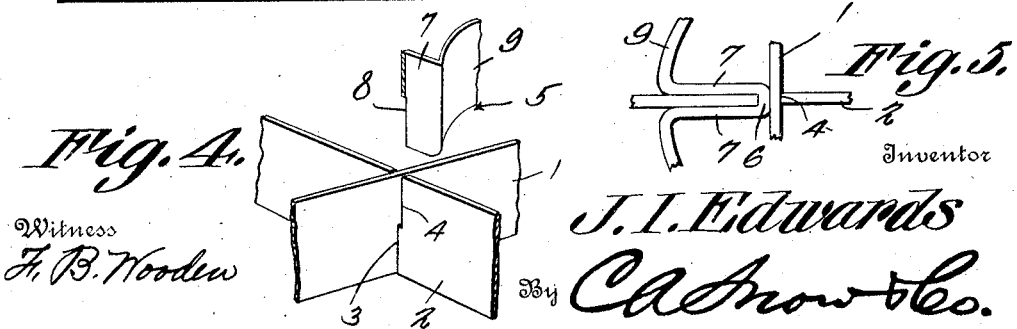
Fig. 4.
Fig. 5.
Witness
F. B. Wooden
Inventor
J. I. Edwards
By C. A. Snow & Co.
Attorneys.

UNITED STATES PATENT OFFICE.

JOSEPH IRVING EDWARDS, OF LIVERMORE, CALIFORNIA.

EGG-CARRIER.

1,362,482.

Specification of Letters Patent.

Patented Dec. 14, 1920.

Application filed October 14, 1918, Serial No. 257,961. Renewed August 4, 1920. Serial No. 401,281.

*To all whom it may concern:*

Be it known that I, JOSEPH I. EDWARDS, a citizen of the United States, residing at Livermore, in the county of Alameda and State of California, have invented a new and useful Egg-Carrier, of which the following is a specification.

The device forming the subject matter of this application is adapted to hold eggs during the shipment thereof, and one object of the invention is to provide a novel form of hollow one piece spacer, adapted to be placed between the egg containers, the spacer being so constructed that certain parts thereof will reinforce other parts of the spacer.

Another object of the invention is to provide a novel form of egg container wherein the cell-forming members serve to reinforce, in a novel way, certain of the walls wherewith the cell-forming members are assembled.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in top plan, a device constructed in accordance with the invention, parts being broken away; Fig. 2 is an end elevation wherein a pair of spacers are disposed above and below a container, parts being broken away; Fig. 3 is a section taken through one of the spacers; Fig. 4 is a composite perspective view, showing a portion of one of the spacers separated from the walls wherewith the spacer coöperates; and Fig. 5 is a detail enlarged from Fig. 1.

The device forming the subject matter of this application includes an egg container comprising first walls 1 and second walls 2 disposed at an angle to each other, to form compartments, the walls 1 and 2 being provided in their opposite edges with interengaged notches 3 and 4. Strips 5 are located between the first walls 1, the strips being provided with abrupt bends 6 defining inwardly extended parallel arms 7 which lie flat against opposite surfaces of the second walls 2 to serve as reinforcements therefor, the bends 6 having notches 8 which coöperate with the notches 4 of the second walls 2. The arms 7 of adjoining bends 6 are connected by outwardly bowed resilient parts 9 which coöperate to form cells 10, and serve to press the arms 7 against the opposite surfaces of the second walls 2. The construction is such that an unusually strong egg container is provided.

Between a pair of egg containers made as above described is placed a spacer, made of a single piece of material, bent upon itself to form a main platform 11, side walls 12, and auxiliary platforms 14 which project inwardly toward each other, the platforms 14 being disposed approximately parallel to the main platform 11. The inner edges of the auxiliary platforms 14 are supplied with angularly disposed contacting flanges 15 which bear against the intermediate portion of the main platform 11 and serve to support the same. The spacer, being made of a single piece of material, and being constructed as above described, is of exceedingly simple makeup, but possesses great strength. The platforms 14 and 11 are provided with openings 16 wherein the ends of the eggs are received, the openings being alined with the cells 10 wherein eggs are placed, the eggs being received between the outwardly bowed parts 9.

The construction of the device is such that the eggs will be held securely against breaking, and both the spacers and the egg containers proper are reinforced to withstand the severe usage incident to shipment and transportation.

Having thus described the invention, what is claimed is:—

1. An egg container comprising first and second walls disposed at an angle to each other to form compartments, and provided in their opposite edges with interengaged notches; and strips located between the first walls, the strips being provided with abrupt bends defining inwardly extended parallel arms which lie flat against opposite surfaces of the second walls to serve as reinforcements therefor, the bends having notches which coöperate with the notches of the second walls, the arms of adjoining bends being connected by outwardly bowed parts which coöperate to form cells and serve to press the arms against the opposite surfaces of the second walls.

2. In a device of the class described, egg containers embodying cells; and hollow spacers between the containers, each spacer being made of a single strip bent to fashion a main platform, side walls, and auxiliary platforms disposed approximately parallel to the main platform, the inner edges of the auxiliary platforms having abutting flanges which engage and support the intermediate portion of the main platform, the platforms being provided with openings alined with the cells.

In testimony that I claim the foregoing as my own, I have hereto affixed my signature in the presence of two witnesses.

JOSEPH IRVING EDWARDS.

Witnesses:
   CHAS. E. BECK,
   E. F. CALLAGHAN.